July 2, 1968  V. J. JEHU  3,390,865
SAFETY FENCES
Filed June 17, 1966  5 Sheets-Sheet 1
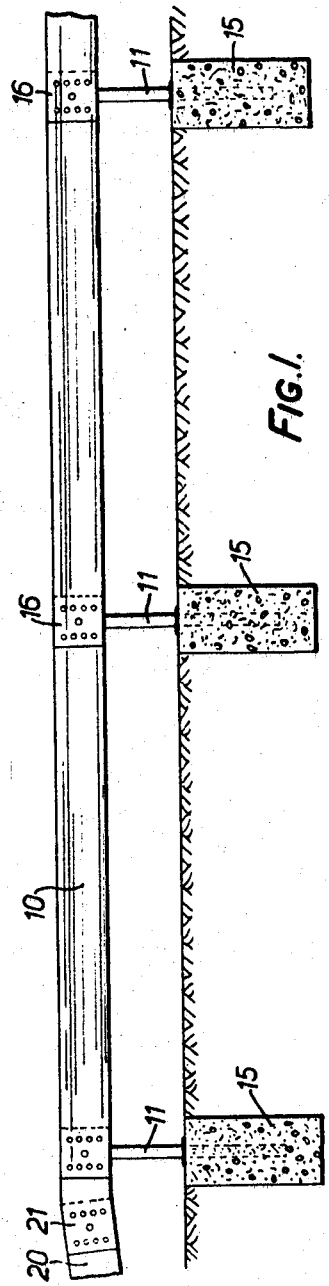
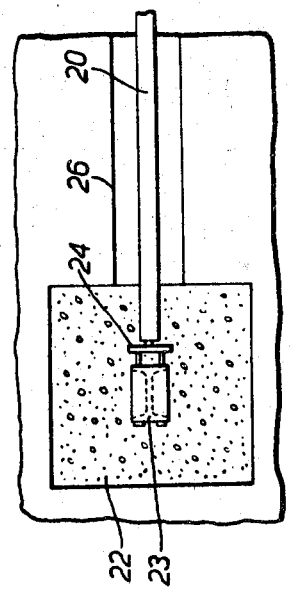
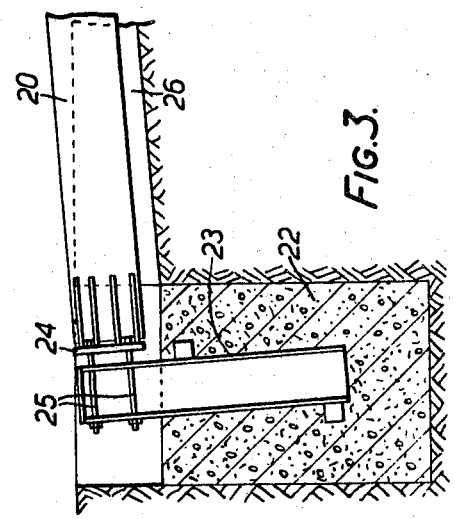
INVENTOR
VICTOR JAMES JEHU
By Young & Thompson
ATTORNEYS

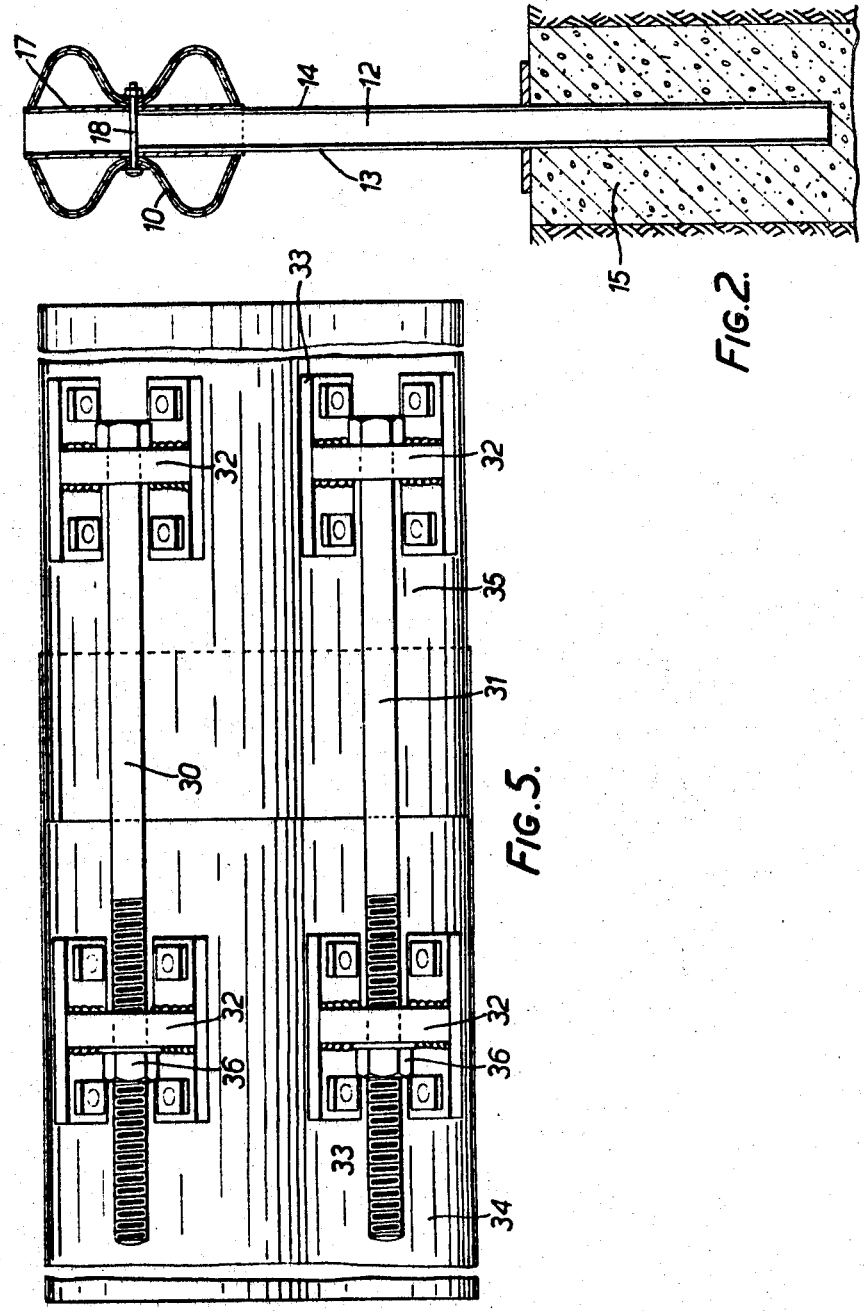

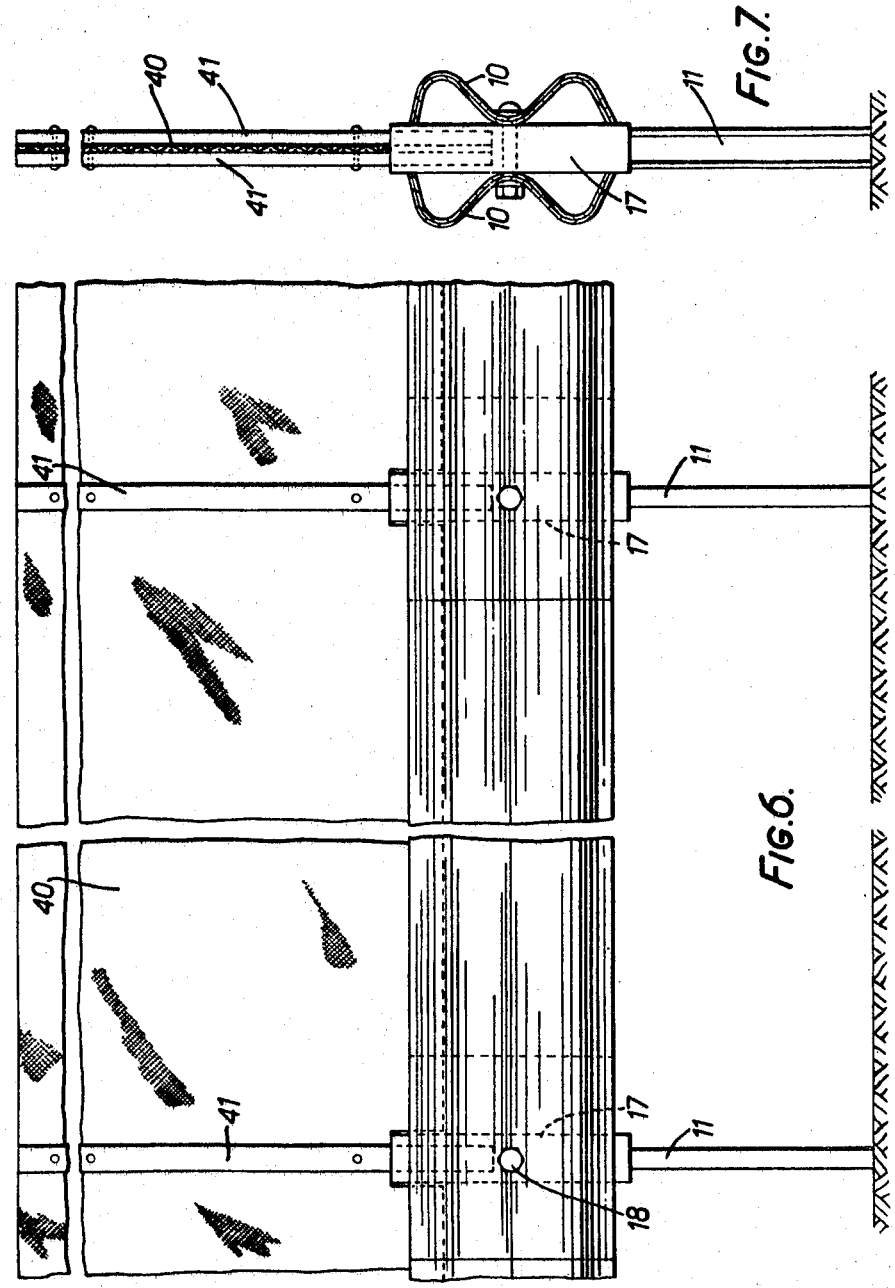

July 2, 1968  V. J. JEHU  3,390,865
SAFETY FENCES
Filed June 17, 1966  5 Sheets-Sheet 4
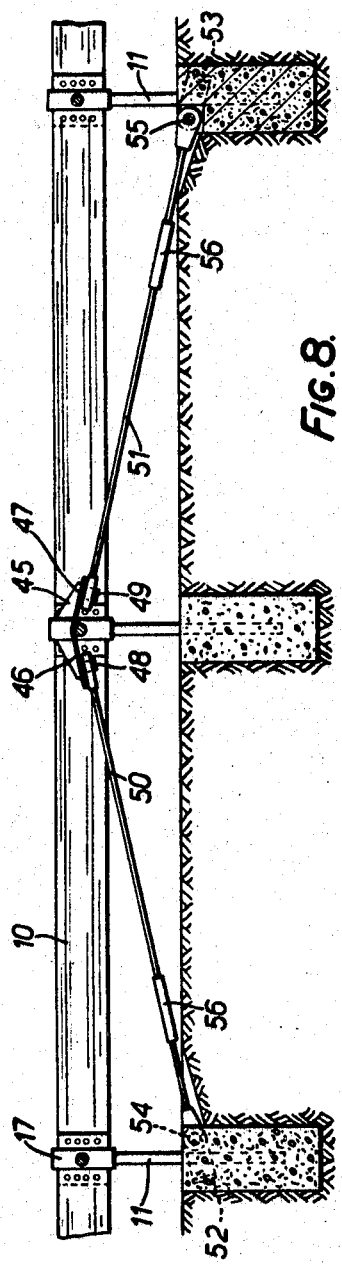
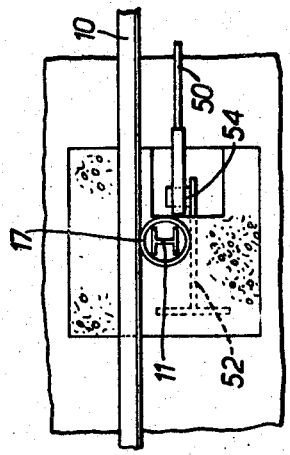
INVENTOR
VICTOR JAMES JEHU
By Young & Thompson
ATTORNEYS July 2, 1968  V. J. JEHU  3,390,865
SAFETY FENCES Filed June 17, 1966  5 Sheets-Sheet 5

INVENTOR
VICTOR JAMES JEHU
By Young & Thompson
ATTORNEYS

3,390,865
SAFETY FENCES

Victor James Jehu, Harmondsworth, West Drayton, Middlesex, England, assignor to National Research Development Corporation, London, England, a corporation of Great Britain
Filed June 17, 1966, Ser. No. 558,373
Claims priority, application Great Britain, June 19, 1965, 26,038/65
9 Claims. (Cl. 256—13.1)

ABSTRACT OF THE DISCLOSURE

A vehicle safety fence is constructed of lengths of corrugated metal sections supported on posts and connected at the ends to buried anchorages, the metal sections being releasably attached to the posts so as to separate therefrom when struck by a vehicle, and hence avoid being carried down to the ground, and the whole fence being placed under tension by intermediate screw-type tensioners spaced along the length of the fence, thus acting as a taught bow, even when separated from the posts.

Summary of the invention claimed

Figure 10:
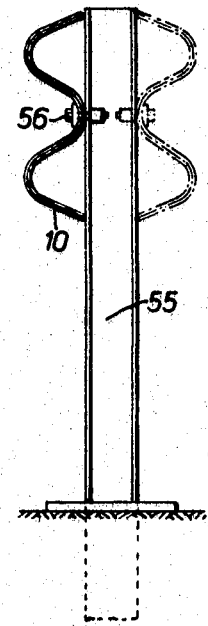

A vehicle safety fence comprising a guard member formed of rigid rail sections connected together and supported on rigid posts which are relatively stiff against lateral deflection, the rail sections being releasably attached to the posts to separate therefrom on impact and maintain their original height, the guard member being placed under tension between buried end anchorages by means of spaced intermediate tensioners, to prevent pocketing of the guard member and overrunning of the fence by an impacting vehicle.

This invention relates to safety fences designed to redirect or prevent passage of vehicles over prohibited ground, and is particularly though not exclusively applicable to safety fences used on the sides or central reservations of high speed roads. The safety fences may also be used for example on bridges, bridge approaches, "flyovers," and other locations.

In existing safety fences comprising rigid metal beam guard rails it is normal to build the guard rail in sections, each firmly bolted to a support post. The posts are made as strong as possible to resist the high impact forces but in practice such safety fences have proved to be somewhat ineffective and in some circumstances actually dangerous. One disadvantage of such fences is that if subjected to very high impact forces the posts are forced backwards and pressed down to the ground and the guard rail is therefore carried down to the ground with the posts. The vehicle can then overrun the safety fence. Another disadvantage of such prior safety fences is that when a vehicle collides with the fence the guard rail tends to bulge or form a pocket at the point of impact and in some circumstances this can cause the vehicle to rebound or spin off the fence with consequent danger to other vehicles on the same road. It is desirable that a safety fence should be able to prevent a vehicle overrunning the fence and should also redirect the vehicle smoothly onto the road without excessive rebound.

The invention consists broadly in a safety fence for vehicles comprising an elongated guard member formed of interconnected rigid or semi-rigid sections supported at intervals on posts and connected at its ends to anchorages, the guard member being pretensioned throughout its length between the anchorages, and connected to the posts by attachment means designed to separate under impact.

In order to facilitate tensioning of the guard member it is preferably connected to the posts in a manner allowing at least limited relative movement therebetween in the direction of the fence, and the connections may be such as to allow the guard member to separate freely from the post in a direction parallel to the vertical axis of the post. Alternatively the connections may be of a type designed to fracture under impact. Moreover the connections preferably include means permitting relative pivotal movement between the guard member and each post about a horizontal axis transverse to the direction of the fence and preferably also permitting relative pivotal movement between the guard member and each post about the vertical axis of the post.

In one construction according to the invention the rail guard member is attached to a support member at each post, the support member fitting loosely into or onto the post so as to be detachable therefrom. Each post is preferably designed with a major strength axis perpendicular to the length of the fence so as to resist lateral impact but to allow the post to be knocked flat relatively easy by a vehicle moving along the fence. Thus preferably each post is of a cross-section having at least two perpendicular flanges or webs, with the main web extending transversely to the direction of the cables or guard members. In such case the support member may conveniently be in the form of a tube fitting over the upper part of the post and the attachment between the tube and the beam may comprise a single horizontal bolt which permits pivotal movement about the axis of the bolt, the tube also allowing pivotal movement relative to the post about its own axis and being separable from the post along the post axis. This construction facilitates separation of the guard rail from the posts as soon as the posts have become appreciably inclined from the vertical.

A safety fence according to the invention may comprise either strong or weak support posts. As explained above a weak post having its major strength axis perpendicular to the length of the fence can be knocked flat relatively easy by a vehicle. This construction is of advantage since it tends to prevent excessive rebound and avoids abrupt pockets in the guard rail. However the safety fence according to the invention may also be used with relatively strong posts, particularly on bridges or bridge approaches where the permissible penetration distance, i.e., the maximum allowable distance through which the fence can be displaced without danger, is limited. When using strong posts, such as hard wood posts buried deep in the ground, the guard member is preferably attached to the posts by support means which hold the guard member displaced laterally from the posts, so as to reduce the risk of part of the vehicle striking the posts themselves. When using strong support posts the guard member will preferably be so connected to the posts that it may become separated under heavy impact, as in the case of weak support posts, to prevent the guard member being carried down to the ground with the posts. In some instances it may be preferred to support the fence on a combination of strong and weak posts, for example where the penetration distance is somewhat limited.

In any case the guard member preferably comprises a series of beams connected end-to-end, and the beams may be of the conventional corrugated sheet type. A tensioning device is provided at one or both ends of a length of the fence, and to facilitate pretensioning of the complete guard member an intermediate adjustable tensioning device may be incorporated between two adjacent beam sections.

The intermediate anchorages, and in some cases the end anchorages also, are preferably so designed that the connection between the guard rail and the anchorage will be disconnected on impact. This can conveniently be arranged by including in the connection a spigot perpendicular to the line of tension and a looped member passing around the spigot and capable of being forced off the free end of the spigot, or vice versa. If the spigot extends laterally the connection will be separated when struck laterally by a vehicle. Alternatively the spigot may extend generally vertically such that a vertically applied force will disconnect the looped member from the spigot.

Figure 11:
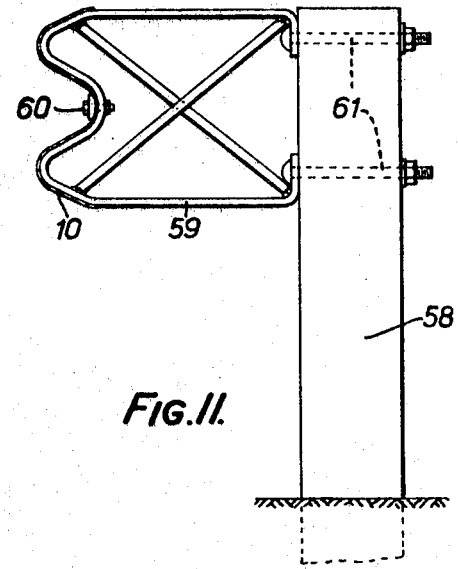

The invention may be performed in various ways and a number of specific embodiments will now be described by way of example with reference to the accompanying drawings, in which FIGURE 1 is a side elevation of a length of safety fence according to the invention, FIGURE 2 is an end elevation in section and on an enlarged scale showing the manner in which the guard rail is mounted on a support post, FIGURES 3 and 4 are a side elevation and plan view, and on an enlarged scale, of an end anchorage, FIGURE 5 is a side elevation on an enlarged scale showing a tension adjusting element included in the guard rail, FIGURE 6 is a side elevation showing an anti-dazzle screen fitted on the safety fence, FIGURE 7 is an end elevation, in section, of the construction of FIGURE 6, FIGURE 8 is a side elevation of a safety fence having an intermediate anchorage, FIGURE 9 is a plan view on an enlarged scale showing one of the anchorage units of FIGURE 8, FIGURE 10 is an end elevation in section, showing an alternative method of mounting the guard rail on a post, and FIGURE 11 is an end elevation in section showing another method of mounting a guard rail offset from a strong post.

In the first example illustrated in FIGURES 1 to 5, the guard rail 10 is carried on a series of upright posts 11 spaced apart at a distance of approximately 10 feet 6 inches. Each post is an H-section steel member with the main web 12 extending transversely to the length of the fence, and the flanges 13, 14, parallel to the fence. The lower part of each post is set into a concrete footing 15 and a sealing washer is provided at ground level to prevent entry of water and dirt into the cavity. The upper end of the post is approximately 2 feet above ground level.

The guard rail consists of a series of corrugated steel beams connected together by an overlapping bolted joint 16 at each post. At each post 11 the overlapping ends of the two adjacent beam sections are bolted to a vertical tube 17 approximately 12 inches in length, the bolt 18 passing through short horizontal slots in the two beam sections and through apertures in opposite sides of the tube at approximately the mid-point in the height of the tube. The internal diameter of the tube is such that it can fit over the upper end of the respective post 11, the bolt 18 resting on the upper end of the H-section member so that the tube is supported vertically with the upper edge of the guard member approximately 30 inches above ground level. Thus each tube 17 is free to be lifted off the respective post parallel to the vertical axis of the post and can also rotate about the post axis. Moreover the single bolt connection between the tube and the guard rail permits relative pivotal movement about the horizontal axis of the bolt and the slotted connection between the bolt and the guard rail allows limited longitudinal movement between the guard rail and each post, the latter being designed to permit tensioning of the guard rail as will be described below.

Each end of a length of the complete guard rail is carried down at the ends to concrete anchorage blocks buried in the ground. One of the end anchorages is illustrated in FIGURES 3 and 4. The last section 20 of the guard rail is connected to the adjacent section by an angled bracket 21 (see FIGURE 1) and is inclined at an angle of approximately 4° to the horizontal. The end anchorage block 22 is buried below ground level and in the block is set a strong H-section steel post 23 whose upper end lies approximately at ground level. The lower end of the guard rail section 20 is bolted to a terminal piece 24 which is secured to the post 23 by four bolts 25 which pass through the flanges of the post and are secured by screwthreaded nuts. This bolted connection also provides means for pre-tensioning the end of the guard rail. In the vicinity of the end anchorage the earth is excavated to form a shallow trench 26 receiving the lower part of the guard rail section 20.

Tensioning devices are preferably incorporated at both ends of the fence to allow the complete guard rail to be pretensioned, sufficient tension being applied to eliminate all slack movement between adjacent beam sections. Moreover, intermediate tensioning devices are preferably provided along the length of the fence. One of these intermediate tensioning devices is illustrated in FIGURE 5 and consists of two long screwthreaded bolts 30, 31 passing through apertured lugs 32 on metal strips 33 secured respectively by welding or rivetting to the rear faces of adjacent ends of a pair of overlapping corrugated beam sections 34, 35, each bolt lying in a trough of the corrugated beam section. By tightening the nuts 36 on the bolts the overlap between the two beam sections can be reduced to apply the necessary tension. For long lengths of fence it may be necessary to include intermediate adjusting devices along the length of the fence at approximately 500 feet intervals.

It will be seen that under severe impact the guard rail will be pushed back locally against the strong axis of the H-section posts, which will be knocked down by the passage of the vehicle. The rail is thus freed from the posts and the vehicle is redirected in a gentle curve by rubbing along the rail which is held at the correct height by the posts remote from the site of the collision.

The arrangement described may be applied to a single-sided barrier, i.e. a safety fence for use at the side of the road, but can also readily be applied to a double-sided fence as required for central reservations on motorways. A double-sided fence can be obtained simply by attaching a second rail to the other side of the posts, using the same support tubes, as illustrated in dotted lines in FIGURE 2.

The construction described is also convenient for the addition of an anti-glare screen above the guard rail. One form of such a screen is illustrated in FIGURE 6. The screen comprises wire mesh or netting 40 carried on upright supports in the form of a pair of wood battens 41 bolted together, with the mesh between, the lower ends of the battens fitting into the upper open ends of the tubes 17 which support the guard rail. The wood battens and the mesh are designed to disintegrate on impact and thus have no adverse affect on the action of the guard rail.

The deflection of the fence under impact can be partly controlled by means of intermediate anchorages positioned at suitable intervals along the length of the fence. One such intermediate anchorage is illustrated in FIGURES 8 and 9. In this construction a double-sided bracket 45 is securely bolted to the guard rail 10 at one of the support posts, this bracket having two outwardly and downwardly inclined flanges 46, 47, each carrying a downwardly projecting spigot 48, 49. From each of these spigots a strong cable tensioning element 50, 51 extends down to a fixed anchorage 52, 53 at the concrete footing of the adjacent post. These fixed anchorages incorporate laterally extending spigots 54, 55, and the ends of the tensioning elements 50, 51 are provided with loops or bushings which fit over the respective spigots 48, 49, 54, 55. Each tensioning element also includes a tension adjusting device 56.

In use such intermediate anchorages tend to reduce the lateral deflection of the fence under impact, and also reduce the tendency for the fence to form a "pocket" when a vehicle collides. If a vehicle actually strikes the intermediate anchorage the spigot construction allows the tensioning elements to become disconnected so that the fence is free to deflect and the vehicle is not trapped on the fence. Thus, if the vehicle is running along the fence from right to left in FIGURE 8 it will knock the tensioning element 51 downwards, disconnecting the upper end from the spigot 49, and it will deflect the element 50 laterally thus disconnecting the lower end of the element from the spigot 54. If the vehicle is travelling in the opposite direction the upper end of element 50 will be knocked down, and disconnected, and the lower end of element 51 will be knocked laterally and disconnected. This system can be applied also to a double-sided fence for the central area of a motorway, so as to function for vehicle impacts on either side of the fence.

An alternative method of mounting the guard rail on the support posts is illustrated in FIGURE 10. In this construction the support posts 55 are H-section metal members, and the guard rail 10 is attached to the posts directly by means of shear bolts 56 passing through the flanges of the posts. The guard rail sections are slotted to receive the bolts 56, and to allow sufficient longitudinal movement for the pre-tensioning of the fence. The bolts 56 are designed to shear under a heavy vehicle impact, so that the posts 55 will be knocked down without pulling the guard rail down.

The support posts described above are relatively weak and are designed to be knocked down by a vehicle running along the fence. In some situations however it may be preferred to use comparatively strong posts which will provide greater resistance to impact. One such construction is illustrated in FIGURE 11 and comprises a hard wood post 58, for example about 6 inches square, set in the ground to a depth of about 4 feet. Such a post will provide substantial resistance, but will ultimately be deflected or broken on a heavy impact. Although the pre-tensioned guard rail will prevent or limit the lateral deflection, it is still desirable that the guard rail should be held away from the posts to reduce the risk of a lower part of the vehicle striking the posts as it runs along the fence. For this purpose the guard rail sections are secured to the posts by means of mild steel cross-braced offset brackets 59. Such reinforced brackets permit the guard rail to be offset laterally from the posts by as much as one foot or more. The guard rail is attached to each bracket by a small shear bolt 60 designed to fracture on heavy impact, and the bracket is attached to the post 58 by bolts 61 which pass through elongated slots in the bracket, thus affording limited longitudinal movement of each bracket on the respective post during the initial erection and pre-tensioning operations.

When a vehicle strikes a safety fence supported on strong posts as illustrated in FIGURE 11 the posts near the point of impact will be pushed back in the soil, and the guard rail will separate from the posts as the holding bolts 60 shear off, thus spreading the load along the fence. Where it is required to use strong posts on a concrete surface, such as on a bridge, the wooden posts may be replaced by steel H-section members of relatively heavy construction welded to steel base plates which are bolted down to the concrete.

In some situations the guard rail may be supported on a combination of weak posts interspersed between strong posts. For example strong posts may be used locally at points where the permissible penetration distance is limited, such as at street lighting columns or telegraph poles. Similarly on bridges light steel posts may be used on the bridge itself, bolted down to the concrete, while strong wooden posts are used on the approaches to the bridge.

Safety fences according to the invention may also comprise a number of guard rails, mounted one above the other. Such multiple-rail constructions are particularly useful as bridge parapet rails. The several rails are preferably connected together by vertical connectors, and arranged to separate as a unit from the supporting posts, so that the complete multiple-rail assembly acts in tension to resist the impact of a colliding vehicle. For example the several rails may be connected at intervals to vertical tubes corresponding to the tubes 17 of FIGURES 1 and 2, each such tube being supported by a single through bolt on an H-section post bolted down to the concrete of the bridge. On impact the tube will then separate from the H-section post, but the complete multiple-rail fence will be maintained at the original level by adjacent posts. The ends of such a bridge parapet rail will be attached to end anchorages embedded in the ground, or to adjacent sections of tensioned safety fence on the bridge approaches. If required various gap-filling materials may be interposed between the spaced guard rails.

The guard rails used in the present invention are preferably formed of corrugated steel sheet and will therefore have considerable longitudinal rigidity but it will be understood that as a result of the pretensioning and other features of the invention semi-rigid rails may be adopted in preference with a view to reducing the impact and the consequent damage to the vehicle.

I claim:

1. A safety fence for vehicles, the fence comprising an elongated guard member having substantial lengthwise rigidity, a plurality of strip-like lengths forming said guard member and each presenting in transverse cross-section a rigid convex surface to an impacting vehicle, a plurality of rigid posts having their major strength axes perpendicular to the line of the fence, said posts being releasably connected to said guard member so as to allow the guard member to become separated from the posts and to maintain its original vertical height on impact of a vehicle against the fence, anchorage means connected to each end of the guard member, and a plurality of intermediate tensioners spaced along the guard member, and each acting between a pair of adjacent lengths of said guard member, said tensioners being adapted to provide each of at least a number of said lengths with a deflection-resisting tension, thereby to remove any slackness from the guard member in the normal state of the fence, and to allow the guard member on impact of a vehicle with sufficient momentum to detach the guard member from the posts, smoothly to redirect the vehicle without the formation of abrupt pockets in the guard member.

2. A safety fence as claimed in claim 1, in which the strip-like lengths of the guard member are corrugated metal sections, the adjacent ends of which overlap, and each intermediate tensioner comprises at least two parallel screw-threaded bolts lying within the troughs of the corrugations and engaging cooperating screwthreaded nuts, the bolts and buts being anchored respectively to adjacent corrugated metal sections.

3. A safety fence as claimed in claim 1, in which the guard member is connected to the posts by means of bolts passing through longitudinally elongated slots in the guard member, thus allowing limited relative movement therebetween in the direction of the fence, the bolts being designed to fracture on impact of a vehicle.

4. A safety fence as claimed in claim 1, in which the guard member is connected to each post in a manner allowing the guard member to separate from the post in a direction parallel to the vertical axis of the post.

5. A safety fence as claimed in claim 4, in which the guard member is attached to a support member at each post, the support member fitting loosely on the post so as to be detachable therefrom.

6. A safety fence as claimed in claim 1, in which the anchorages are buried in the ground, and the ends of the guard member are inclined downwards and connected to the anchorages.

7. A safety fence as claimed in claim 6, in which the connection between the guard member and an anchorage is arranged to become separated on impact of a vehicle.

8. A safety fence as claimed in claim 7, in which the connection includes a spigot perpendicular to the line of tension, and a looped member passing around the spigot, and capable of being forced off the free end of the spigot.

9. A safety fence as claimed in claim 1, having guard members extending on both sides of the posts.

References Cited

UNITED STATES PATENTS

| | | | |
|---|---|---|---|
| 2,062,408 | 12/1936 | Edge | 256—13.1 X |
| 2,091,195 | 8/1937 | Dennebaum | 256—13.1 X |
| 2,196,290 | 4/1940 | Camp | 256—13.1 |
| 2,227,958 | 1/1941 | Camp | 256—13.1 |
| 2,228,652 | 1/1941 | Dailey | 256—13.1 |
| 3,114,303 | 12/1963 | Oberbach | 256—13.1 X |
| 3,314,658 | 4/1967 | Shoemaker | 256—13.1 |
| 3,332,666 | 7/1967 | Gray | 256—13.1 |

FOREIGN PATENTS 232,030  2/1964  Austria.

DAVID J. WILLIAMOWSKY, *Primary Examiner.*

D. L. TAYLOR, *Examiner.*